US007165950B2

(12) United States Patent
Fenny et al.

(10) Patent No.: US 7,165,950 B2
(45) Date of Patent: Jan. 23, 2007

(54) TWO-STAGE PRESSURE RELIEF VALVE

(75) Inventors: Carlos A. Fenny, Arlington, TX (US); Darrel B. Bryan, Basiglio (IT); David P. Schultz, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 451 days.

(21) Appl. No.: 10/736,161

(22) Filed: Dec. 15, 2003

(65) Prior Publication Data

US 2005/0129531 A1 Jun. 16, 2005

(51) Int. Cl.
*F04B 1/26* (2006.01)
*F04B 49/24* (2006.01)
*F15B 21/02* (2006.01)
*F16D 31/02* (2006.01)
*F04F 1/00* (2006.01)

(52) U.S. Cl. ...................... 417/270; 417/290; 417/308; 91/38; 60/468; 137/130

(58) Field of Classification Search ................ 417/290, 417/270, 307, 308; 60/468, 494, 456; 137/130, 137/625.28; 91/38; 251/117
See application file for complete search history.

(56) References Cited

U.S. PATENT DOCUMENTS

| | | | | |
|---|---|---|---|---|
| 3,067,689 | A | 12/1962 | Hause | 103/42 |
| 3,289,605 | A * | 12/1966 | Ward et al. | 91/486 |
| 4,340,337 | A | 7/1982 | Bristow et al. | 417/304 |
| 4,360,322 | A | 11/1982 | Bristow et al. | 417/300 |
| 4,391,569 | A | 7/1983 | Bristow et al. | 417/302 |
| 4,511,313 | A | 4/1985 | Ishizuka et al. | 417/270 |
| 4,798,050 | A * | 1/1989 | Nakamura et al. | 60/329 |
| 5,651,665 | A | 7/1997 | Can et al. | 417/300 |
| 6,718,763 | B1 * | 4/2004 | Maruta et al. | 60/468 |
| 6,755,625 | B1 * | 6/2004 | Breeden | 417/298 |

* cited by examiner

*Primary Examiner*—Charles G. Freay
(74) *Attorney, Agent, or Firm*—James E. Walton

(57) ABSTRACT

A two-stage pressure relief valve for use with hydraulic systems is disclosed. The two-stage pressure relief valve has a first stage that relieves increases in hydraulic system pressure over the normal operating pressure and up to a selected threshold pressure level, and a second stage that brings the hydraulic system pressure down to a selected reduced operating pressure that is below the normal operating pressure in response to increases in the operating pressure over the threshold pressure level.

19 Claims, 5 Drawing Sheets

TWO-STAGE PRESSURE RELIEF VALVE

BACKGROUND

1. Field of the Invention

The present invention relates to hydraulic power systems using pumps with pressure compensators.

2. Description of Related Art

In aircraft hydraulic systems, hydraulic pressure is maintained at a constant magnitude under changing flow demands by using pumps with pressure compensation mechanisms. For each pump, as hydraulic system flow demands change, the compensator adjusts the pump displacement by sensing and responding to the system pressure. If the system pressure drops, the compensator increases the pump displacement, thereby increasing flow and boosting the system pressure. If the system pressure increases, the compensator decreases the pump displacement, thereby decreasing flow and lowering the system pressure.

In most aircraft, there is usually no way to correct a failed pump. In pump failure situations, the failed pump is ignored and a backup pump is used. However, pressure relief valves are utilized in aircraft hydraulic systems to reduce high system pressures that result from pump compensators that fail and remain stuck in the maximum flow position. When pump compensators fail and remain in the maximum flow position, excessive heat is generated by the high flow rates through the hydraulic system. As a result, heat exchangers must be added to the hydraulic system to dissipate the excess heat.

There are basically two methods used in aircraft hydraulic system design to prevent system overheating as a result of hydraulic pump compensator failures. One method is to oversize the hydraulic system heat exchanger capacity by about 40–50% to account for the additional heat resulting from the failure. This method requires additional space on the aircraft and adds a significant amount of weight to the aircraft.

The other method is to install a solenoid operated bypass valve or shut-off valve that allows the operator to manually isolate the pump from the hydraulic system. With a bypass valve, the solenoid actuates a spool that connects the outlet to the inlet. With a shut-off valve, the solenoid pushes a spool that blocks the outlet completely. Once the solenoid operated bypass valve or shut-off valve is activated, all hydraulic power from that system is lost. Solenoid operated bypass valves and shut-off valves are relatively unreliable, and require an external electrical power source. This increases their probability of failure. In addition, this method can result in the failure of a hydraulic system as a result of an electrical short.

Referring to FIGS. 1 and 2 in the drawings, a prior-art variable displacement pump 11 having a pressure compensator valve, also known as a flat cut-off pump, is illustrated. Pump 11 has a case 13, a drive shaft 15, a rotating block 17 driven by drive shaft 15, pistons 19 and 21, and a pivoting pump yoke 23. Pump yoke 23 is spring biased against a yoke actuating piston 25 by a yoke spring 27. Yoke actuating piston 25 is actuated by a compensator valve 29. The trigger pressure of compensator valve 29 is controlled by a compensator valve spring 31 and a pressure adjustment screw 33. Actuation of yoke actuating piston 25 causes pump yoke to pivot about a pivot pin 29, thereby adjusting the stoke displacement of pistons 19 and 21. As is shown in FIG. 2, pump yoke 23 pivots between a minimum stroke position indicated by dashed lines, and a maximum stroke position indicated by solid lines.

If the outlet pressure exceeds the trigger pressure of compensator valve 29, compensator valve 29 opens causing an increase in the pressure on yoke actuating piston 25. Actuation of yoke actuating piston 25 forces pump yoke 23 to pivot about pivot pin 29 against yoke spring 27 into a position in which the stoke displacement of pistons 19 and 21 is reduced. The reduction in the stoke displacement of pistons 19 and 21 reduces the outlet pressure.

A specific compensator mechanism failure mode that must be considered when designing a hydraulic system is when the compensator valve sticks in the maximum displacement position. Under this type of failure, the pump flow exceeds system demand, resulting in the system pressure exceeding the allowable design limit. For most aircraft hydraulic systems, the allowable design limit pressure is 50% higher than the normal system pressure. To prevent damage to the hydraulic system as a result of the failure of a compensator valve, pressure relief valves are incorporated into the hydraulic system to ensure that the system pressure does not exceed safe values.

To ensure that the pressure relief valve does not open unless the pump compensator fails, the opening pressure of the relief valve is usually set 20–30% higher than the normal system operating pressure. For example, in an aircraft hydraulic system having a normal system operating pressure of about 3,000 psi, the design limit pressure would be about 4,500 psi, and the pressure relief valve would be designed to open at about 3,600–3,900 psi.

Although the pressure relief valve protects the hydraulic system from damage due to over pressurization, relief valve operation can induce a second equally critical problem: hydraulic system overheating. As a byproduct of the normal work performed by the pump pushing fluid through the hydraulic system, heat is generated. The larger the flow or higher the system pressure, the greater the heat generated. To address this problem, heat exchanges, or radiators, are incorporated into the hydraulic system to dissipate the excess heat.

Referring now to FIG. 3 in the drawings, a schematic of a typical prior-art hydraulic system 51 is illustrated. Hydraulic system 51 is representative of a wide variety of hydraulic systems, not just aircraft hydraulic systems. Hydraulic system 51 includes a hydraulic pump 53, a hydraulic reservoir 55, a hydraulic actuator 57, a pressure relief valve 59, and a heat exchanger 61.

Referring now to FIG. 4 in the drawings, a schematic of another typical prior-art hydraulic system 71 is illustrated. Hydraulic system 71 is also representative of a wide variety of hydraulic systems, not just aircraft hydraulic systems. Hydraulic system 71 includes a hydraulic pump 73, a hydraulic reservoir 75, a hydraulic actuator 77, a pressure relief valve 79, and a heat exchanger 81. Hydraulic system 71 also includes a solenoid operated bypass valve 83 for isolating hydraulic system 71 by connecting the inlet port to the outlet port.

The size of the heat exchanger required for a given hydraulic system is normally based on the average pump flow at the normal system operating pressure. However, following a pump compensator failure and resultant opening of a pressure relief valve, system pressure typically increases by 20–30%. Therefore, to prevent the hydraulic system from overheating following a pump compensation failure, either the heat exchanger capacity must be greatly increased, or a device must be incorporated to relieve system pressure to a level below normal operating pressure.

The current methods of preventing hydraulic systems from overheating following pump compensation failures do not adequately solve the problem. Solenoid operated bypass valves or shut-off valves are unreliable, require an electrical power source, and add weight to the system. Oversizing the heat exchangers is expensive, requires additional space, and adds weight to the system. Thus, although these methods represent great strides in the area of hydraulic power systems, many shortcomings remain.

SUMMARY OF THE INVENTION

There is a need for a hydraulic system in which solenoid operated shut off valves and oversized heat exchangers are not required.

Therefore, it is an object of the present invention to provide a hydraulic system in which solenoid operated shut off valves and oversized heat exchangers are not required.

These and other objects are achieved by providing a hydraulic system having a two-stage pressure relief valve. The two-stage pressure relief valve of the present invention has a first stage that relieves increases in hydraulic system pressure over the normal operating pressure and up to a selected threshold pressure level, and a second stage that brings the hydraulic system pressure down to a selected reduced operating pressure that is below the normal operating pressure in response to increases in the operating pressure over the threshold pressure level.

The present invention provides significant advantages, including: (1) it has the ability to provide limited hydraulic power to the aircraft following a pump compensator failure; (2) it is more reliable than solenoid operated bypass valves; (3) it is less expensive than oversizing heat exchangers or adding solenoid operated bypass valves; and (4) it weighs less than oversized heat exchangers and solenoid operated bypass valves.

Additional objectives, features and advantages will be apparent in the written description which follows.

DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

Figure 1:
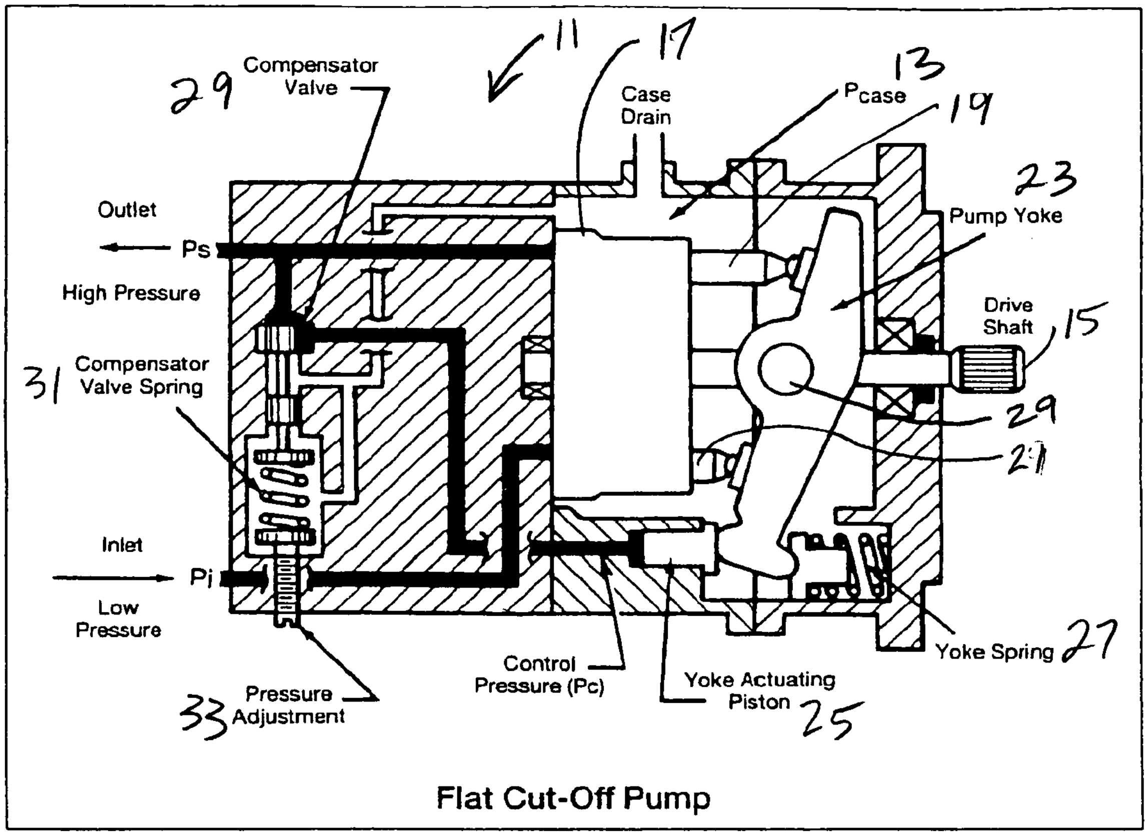
FIGURE 1 (PRIOR ART)
FIG. 1 is a schematic of a prior-art variable displacement pump having a pressure compensator valve, also known as a flat cut-off pump.
Figure 2:
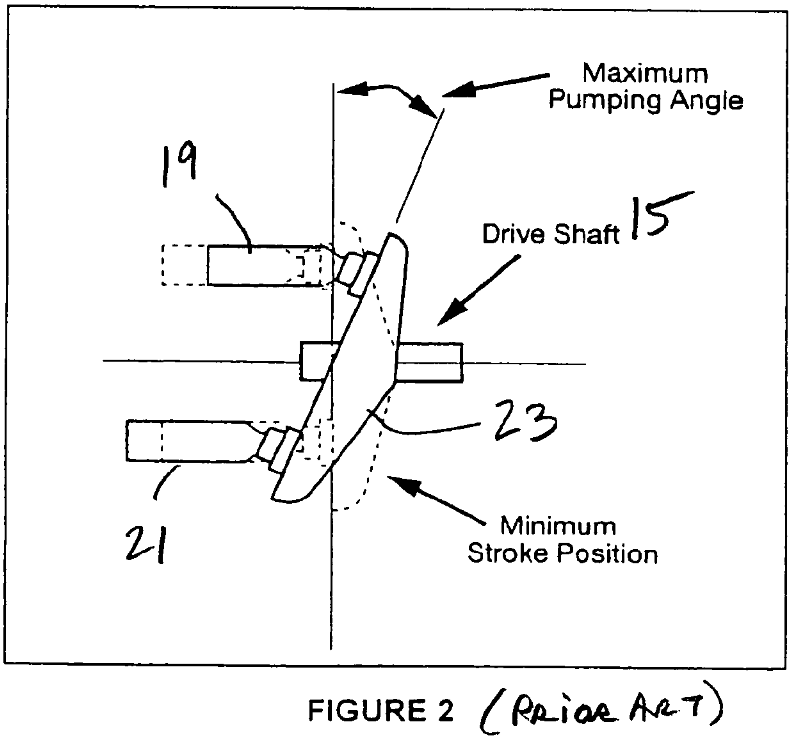
FIGURE 2 (PRIOR ART)
FIG. 2 is a schematic of the pump yoke of the variable displacement pump of FIG. 1.
Figure 3:
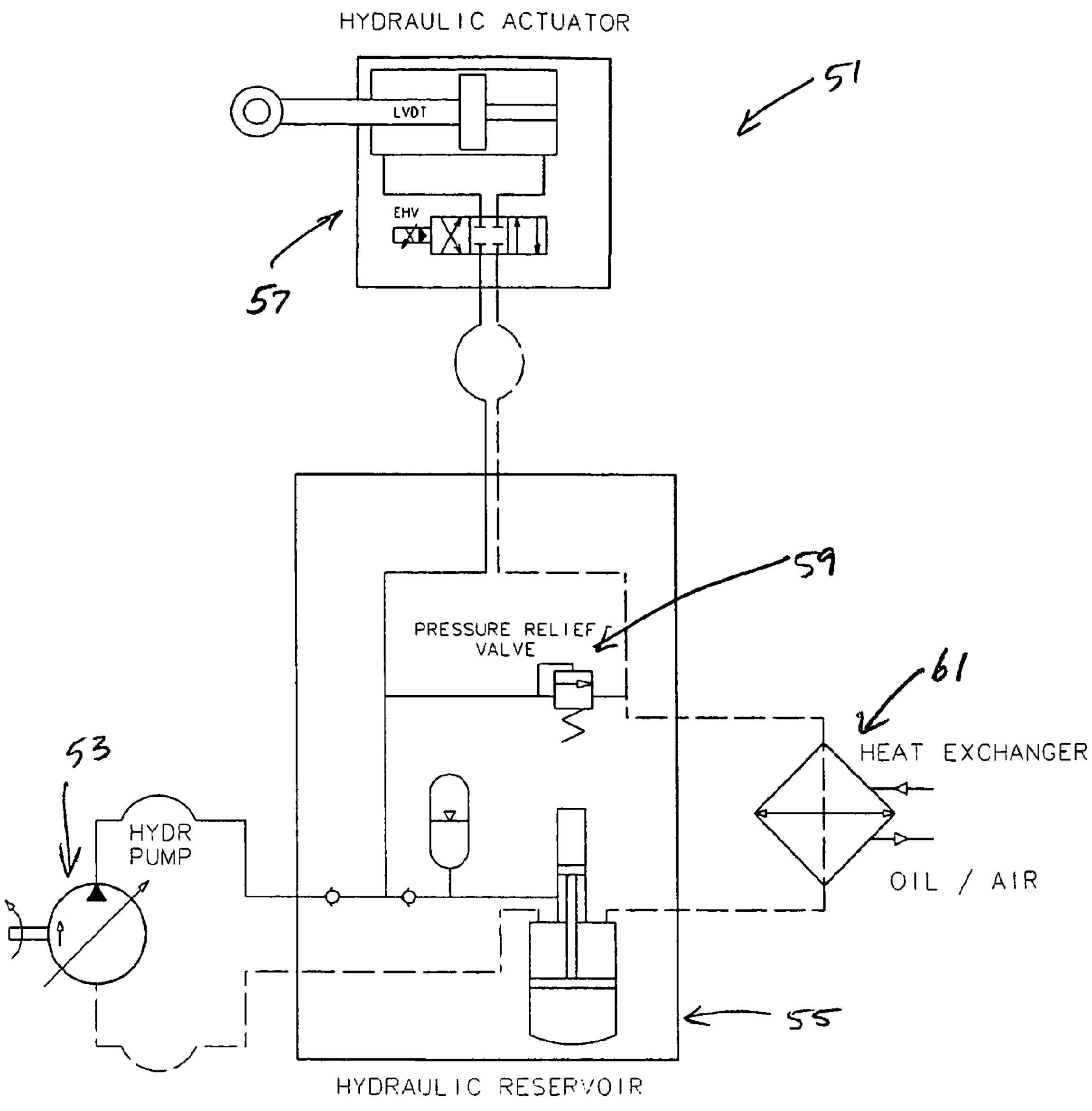
Figure 3 (Prior Art)
FIG. 3 is a schematic of a prior-art hydraulic system having a pressure relief valve and a heat exchanger.
Figure 4:
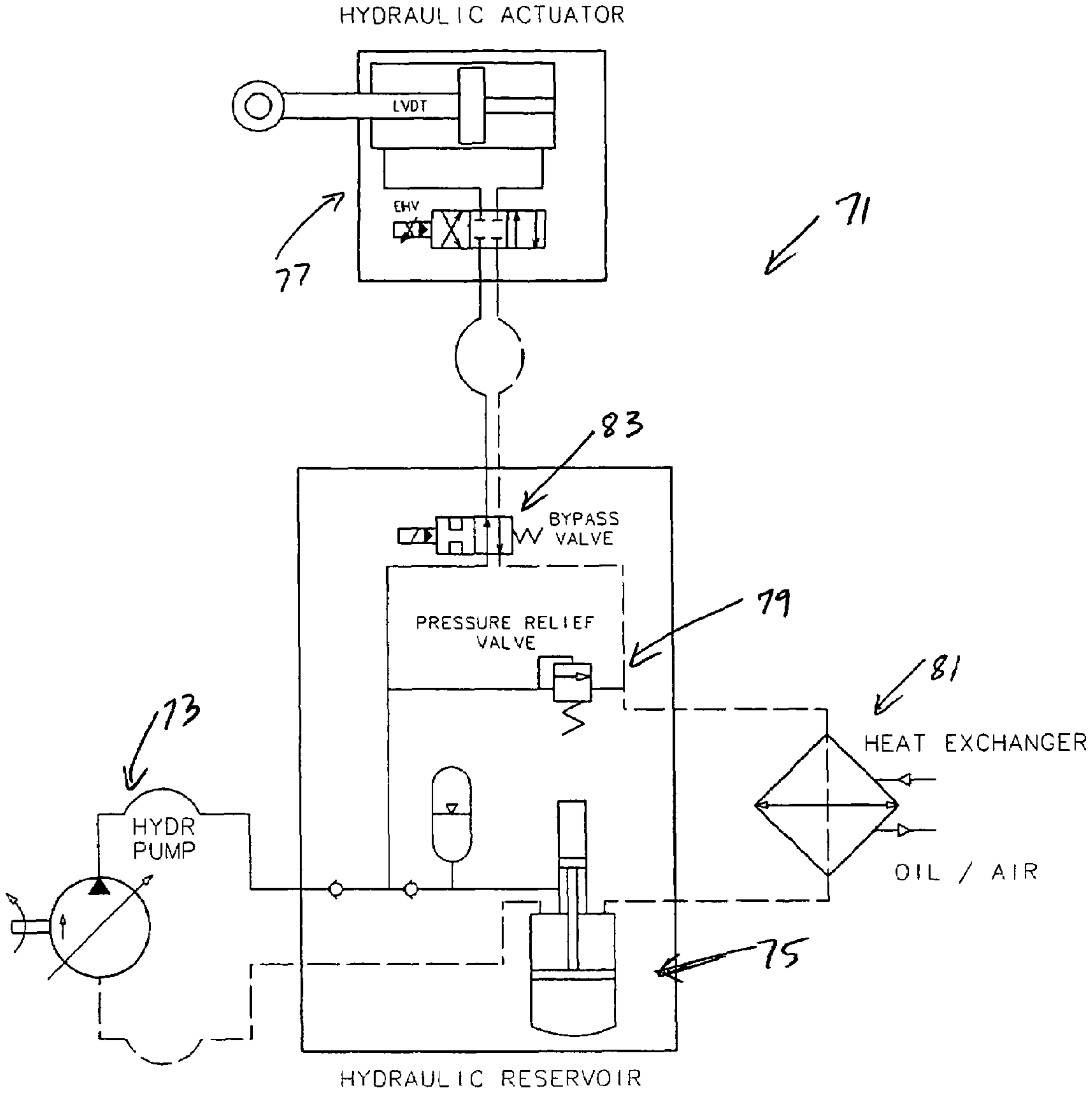
Figure 4 (Prior Art)
FIG. 4 is a schematic of a prior-art hydraulic system having a pressure relief valve, a heat exchanger, and a bypass valve.
Figure 5:
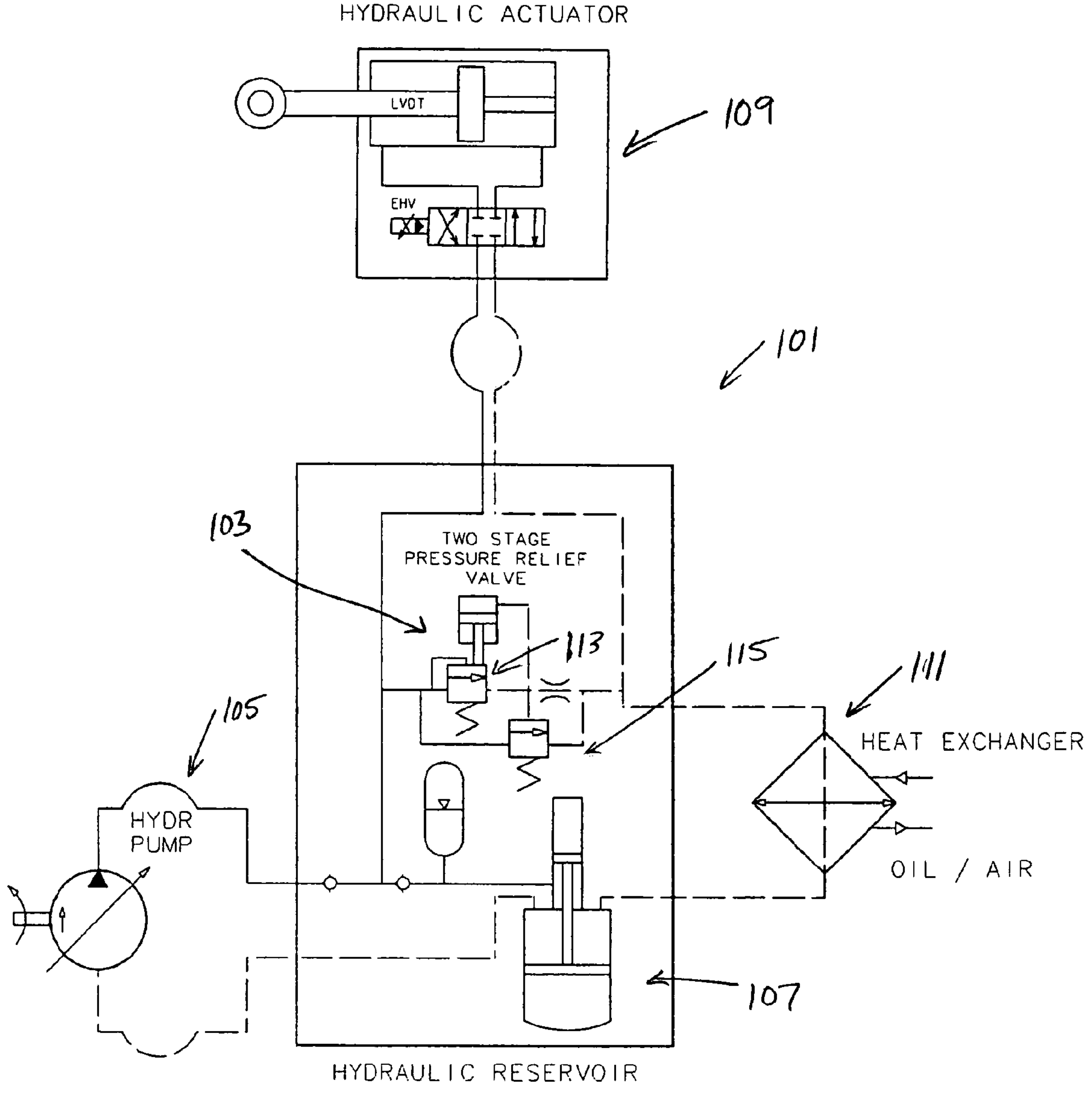
FIG. 5 is a schematic of a hydraulic system having a two-stage pressure relief valve according to the present invention.

Referring to FIG. 5 in the drawings, a hydraulic system 101 having a two-stage pressure relief valve 103 for preventing damage resulting from hydraulic pump compensator failure according to the present invention is illustrated. Hydraulic system 101 includes a variable displacement hydraulic pump 105, a hydraulic reservoir 107, a hydraulic actuator 109, an optional heat exchanger 111, and two-stage pressure relief valve 103.

Pressure relief valve 103 operates in two distinct stages: a first stage 113, and a second stage 115. First stage 113 of pressure relief valve 103 opens when the system pressure exceeds the normal operating pressure and relieves all pressure increases up to a threshold pressure level, which is preferably up to about 30% over the normal operating pressure. With this capacity, first stage 113 can relieve increases in pressure that result from pump compensators failing in the fully open position. In this manner, first stage 113 protects hydraulic system 101 from damage due to over-pressurization. For example, in an aircraft hydraulic system having a normal system operating pressure of about 3,000 psi, the design limit pressure would be about 4,500 psi, and first stage 113 of pressure relief valve 103 would accommodate pressure increases up to about 3,900 psi.

As a byproduct of the normal work performed by hydraulic pump 105 pushing fluid through hydraulic system 101, heat is generated. The larger the flow or the higher the system pressure, the greater the heat generated. Optional heat exchanger 111 dissipates any excess heat generated within hydraulic system 101. In most instances, heat exchanger 111 is based upon the average pump flow at normal operating pressure. It is desirable to keep the size of heat exchanger 111 as small as possible. This is particularly true when the hydraulic system is used in an aircraft, where size and weight are of critical importance. If the hydraulic pump compensator fails in the fully open position, heat exchanger 111 may not be large enough to dissipate the excess heat generated within hydraulic system 101, even with first stage 113 open. Protecting against hydraulic system overheating is one of the functions of second stage 115.

Second stage 115 becomes operable only in certain circumstances. In the preferred embodiment, second stage 115 opens only after the hydraulic system pressure has risen above the threshold level and remained at that elevated level for a selected period of time, such as approximately 1 second. This ensures that the elevated system pressure is not due to a short spike in pressure. The purpose of second stage 115 is to drop the hydraulic system pressure below the normal operating pressure. It is preferred that when second stage 115 is fully open, the operating pressure of the hydraulic system is brought down to a level that is about 30% below the normal operating pressure. This eliminates the need to fully shut down the hydraulic system. Two-stage pressure relief valve 103 allows the damaged or malfunctioning hydraulic system and its associated hydraulic actuators to continue to function at reduced capacity. For example, if a certain tiltrotor aircraft has a normal hydraulic system operating pressure of about 3,000 psi, second stage 115 of two-stage pressure relief valve 103 drops the system pressure by 30% to about 2,100 psi. In this manner, second stage 115 obviates the need to oversize heat exchanger 111 to account for the additional heat generated following a pump compensator failure, but allows the hydraulic system to function at a reduced capacity.

Referring now to FIGS. 6A–6D in the drawings, one possible mechanical configuration of a two-stage pressure relief valve 201 according to the present invention is shown in a series of cross-sectional views representing different stages of operation. In the example depicted in FIGS.

6A–6D, a relief valve 201 is used with an aircraft hydraulic system having a normal operating pressure of about 3,000 psi.

Relief valve 201 includes a supply port 203, a return port 205, a spool 207, a spring 209, a restrictor 211, a first stage flow channel 210, a second stage flow channel 212, and a network of other flow channels 213. Hydraulic fluid is received into relief valve 201 through supply port 203, passes through flow channels 210, 212, and 213, and is returned to a hydraulic fluid reservoir (not shown) through return port 205. Spool 207 is selectively configured to open and close specific flow channels as spool 207 moves back and forth in an axial direction along a longitudinal axis 214. The movement of spool 207 is restricted by spring 209. Spring 209 is preferably preloaded to match the normal operating pressure of the hydraulic system, in this example, 3,000 psi.

Figure 6A:
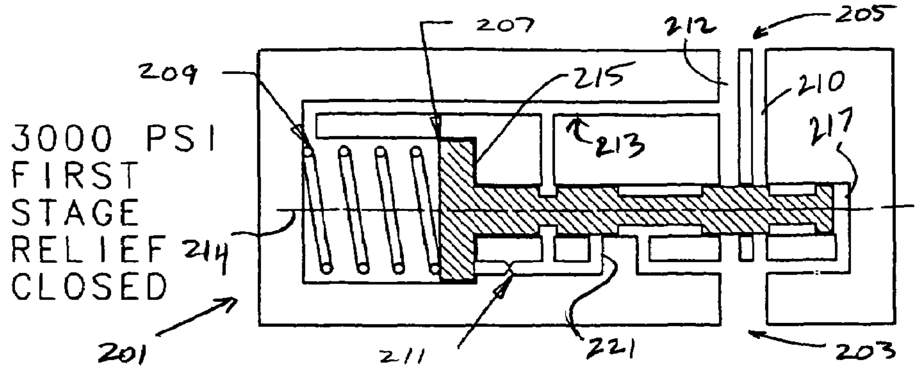
FIGS. 6A–6D are cross-sectional views of one possible mechanical configuration of the two-stage pressure relief valve according to the present invention.

In FIG. 6A, relief valve 201 is shown in a normal operating mode in which both the first stage and the second stage are in closed positions, i.e., flow through flow channels 210 and 212 is blocked off. In this state, the hydraulic system operating pressure is about 3,000 psi. As is shown, spool 207 is biased by spring 209 into a closed position in which spool 207 is bottomed out against a flange 215. In this closed position, the system hydraulic fluid is allowed to fill a first chamber 217, but is not allowed to pass across relief valve 201 from supply port 203 to return port 205. Any increase in the hydraulic system pressure over 3,000 psi will result in compression of spring 209 and movement of spool 207 to the left but will not open the first stage flow channel 210. An increase in the hydraulic system pressure over 3,650 psi will result in compression of spring 209 and movement of spool 207 to the sufficiently to the left to open the first stage flow channel 210.

Figure 6B:
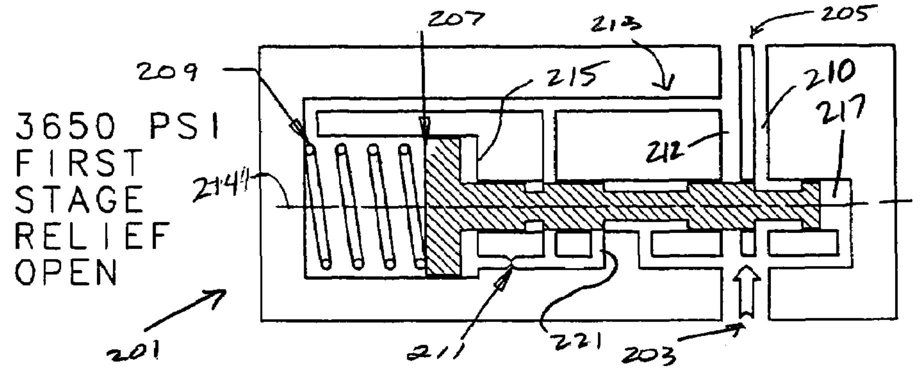

In FIG. 6B, relief valve 201 is shown in a first stage relief open mode in which first stage flow channel 210 is open, but second stage flow channel 212 remains blocked by spool 207. This state represents an operational condition in which the hydraulic system pressure has risen to a selected threshold level, in this case, about 3,650 psi. This elevated system pressure condition is indicative of a hydraulic pump compensator failing in the fully open position. The increased pressure of the hydraulic system fluid in first chamber 217 opposes the force of spring 209 and causes spool 207 to move to the left. This results in the opening of first stage flow channel 210, which allows the hydraulic fluid to flow out though return port 205 to the hydraulic reservoir, thereby preventing damage to any hydraulic actuators connected to the hydraulic system. First stage flow channel 210 is sized and configured to accommodate flow at the hydraulic system threshold pressure level.

Figure 6C:
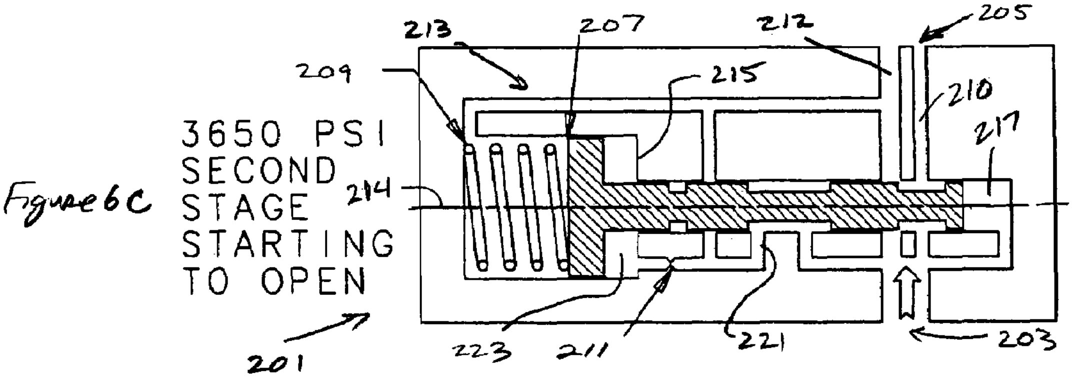

In FIG. 6C, relief valve 201 is shown in a second stage relief open mode in which first stage flow channel 210 is open and second stage flow channel 212 is starting to open. This position will occur if the 3,650 psi threshold pressure is sustained for a pre-selected time of approximately 1 second. Restrictor 211 is disposed within restricted flow channel 221 and acts as a timer to ensure that any elevated system pressure is not due to a short spike in pressure. If the duration of the pressure spike is shorter than a pre-selected time, then restrictor 211 will prevent second stage flow channel 212 from fully opening, and spool 207 will return to a position in which first stage flow channel 210 and second stage flow channel 212 are closed. On the other hand, if the duration of the pressure spike is longer than the pre-selected time, then restrictor 211 and flow channel 221 will allow second chamber 223 to fill with hydraulic fluid, and spool 207 will continue to open to a position in which second stage flow channel 212 is completely open.

Figure 6D:
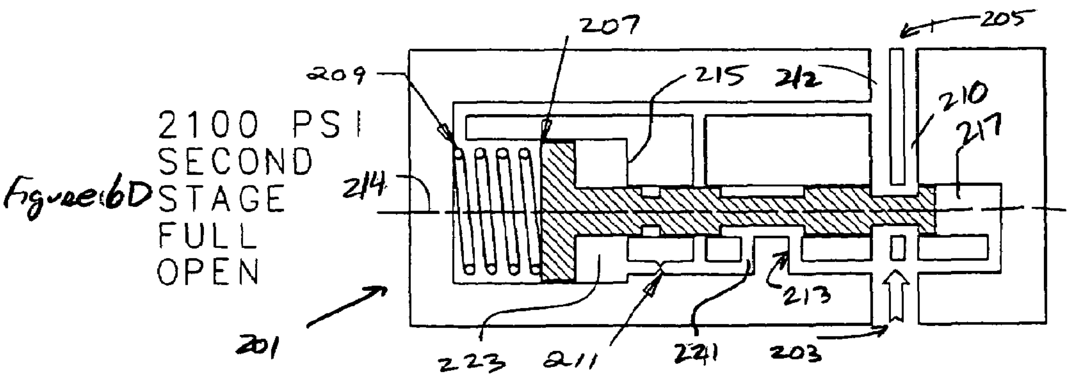

In FIG. 6D, relief valve 201 is shown in a second stage relief open mode in which first stage flow channel 210 and second stage flow channel 212 are both fully open. This state becomes operational if the hydraulic system pressure at supply port 203 exceeds the threshold level for a duration of time greater than the pre-selected limit, in this example, 3,650 psi for longer than one second. Because the pressure of hydraulic system 201 is a function of the flow and restriction of flow of the hydraulic fluid, the pressure of the hydraulic system can be manipulated by selectively sizing and shaping first and second stage flow channels 210 and 212, restrictor 211, and spool 207.

As second chamber 223 begins to fill with hydraulic fluid, the pressure of the hydraulic system is brought down to a reduced operating pressure. In the preferred embodiment, this reduced operating pressure is about 30% below the normal operating pressure. In the current example, the reduced operating pressure is about 2,100 psi. As long as both the first and second stages of relief valve 201 remain open, the hydraulic system will operate at the reduced operating pressure. In the aircraft hydraulic system example, this reduced operating pressure of 2,100 psi to 2400 psi is adequate to operate some of the hydraulic components, such as the landing gear extension and some limited flight control functions.

It will be appreciated that the mechanical configuration depicted in FIGS. 6A–6D is merely one possible configuration of the two-stage pressure relief valve according to the present invention. Although the subject invention has been described with reference to a hydraulic system for an aircraft, it should be understood that the subject invention may be utilized in any hydraulic system application in which it is desirable to have customized pressure relief without the use of solenoid operated pressure relief valves and/or oversized heat exchangers.

It is apparent that an invention with significant advantages has been described and illustrated. Although the present invention is shown in a limited number of forms, it is not limited to just these forms, but is amenable to various changes and modifications without departing from the spirit thereof.

We claim:

1. A hydraulic system for an aircraft comprising:

a hydraulic pump for pumping a hydraulic fluid through the hydraulic system at a normal operating pressure;

a reservoir for holding the hydraulic fluid; and a two-stage pressure relief valve comprising:

a first stage for compensating for increases in hydraulic system pressure over the normal operating pressure and up to a selected threshold pressure level; and a second stage for bringing the hydraulic system pressure down to a selected reduced operating pressure that is below the normal operating pressure in response to increases in the operating pressure over the threshold pressure level.

2. The hydraulic system according to claim 1, further comprising:

a heat exchanger for cooling the hydraulic fluid.

3. The hydraulic system according to claim 1, further comprising:

a timing means operably associated with the second stage for delaying full operation of the second stage.

4. The hydraulic system according to claim 3, wherein the timing means is a flow restrictor.

5. The hydraulic system according to claim 3, wherein the timing means allows for short spikes in the pressure of the hydraulic system prior to opening of the second stage.

6. The hydraulic system according to claim 1, wherein the threshold pressure level is about 22% higher than normal operating pressure.

7. The hydraulic system according to claim 1, wherein the selected reduced operating pressure is about 30% lower than the normal operating pressure.

8. A two-stage pressure relief valve for a hydraulic system, comprising:

a first means for compensating for increases in a hydraulic system pressure over a normal operating pressure and up to a selected threshold pressure level; and a second means for bringing the hydraulic system pressure down to a selected reduced operating pressure that is below the normal operating pressure in response to increases in the operating pressure over the threshold pressure level.

9. The two-stage pressure relief valve according to claim 8, further comprising:

a timing means operably associated with the second means for delaying full operation of the second means.

10. The two-stage pressure relief valve according to claim 8, further comprising:

a flow restrictor operably associated with the second means for delaying full operation of the second means.

11. The two-stage pressure relief valve according to claim 8, further comprising:

a timing means operably associated with the second means for delaying full operation of the second means;

wherein the timing means allows for short spikes in the pressure of the hydraulic system prior to opening of the second means.

12. The two-stage pressure relief valve according to claim 8, wherein the threshold pressure level is about 22% higher than the normal operating pressure.

13. The two-stage pressure relief valve according to claim 8, wherein the reduced operating pressure is about 30% lower than the normal operating pressure.

14. A hydraulic system, comprising:

a hydraulic pump for pumping a hydraulic fluid at a hydraulic system pressure; and a two-stage pressure relief valve comprising:

a first means for compensating for increases in the hydraulic system pressure over a normal operating pressure and up to a selected threshold pressure level; and a second means for bringing the hydraulic system pressure down to a selected reduced operating pressure that is below the normal operating pressure in response to increases in the operating pressure over the threshold pressure level.

15. The hydraulic system according to claim 14, further comprising:

a timing means operably associated with the second means for delaying full operation of the second means.

16. The hydraulic system according to claim 14, further comprising:

a flow restrictor operably associated with the second means for delaying full operation of the second means.

17. The hydraulic system according to claim 14, further comprising:

a timing means operably associated with the second means for delaying full operation of the second means;

wherein the timing means allows for short spikes in the hydraulic system pressure prior to opening of the second means.

18. The hydraulic system according to claim 14, wherein the threshold pressure level is about 22% higher than the normal operating pressure.

19. The hydraulic system according to claim 14, wherein the reduced operating pressure is about 30% lower than the normal operating pressure.

* * * * *